(12) United States Patent
Sakai

(10) Patent No.: US 8,792,585 B2
(45) Date of Patent: Jul. 29, 2014

(54) RANK ESTIMATION DEVICE, RECEIVER, COMMUNICATION SYSTEM, RANK ESTIMATION METHOD, AND PROGRAM RECORDING MEDIUM

(75) Inventor: Masahito Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 101 days.

(21) Appl. No.: 13/254,331

(22) PCT Filed: Mar. 2, 2010

(86) PCT No.: PCT/JP2010/053716
§ 371 (c)(1),
(2), (4) Date: Sep. 1, 2011

(87) PCT Pub. No.: WO2010/104016
PCT Pub. Date: Sep. 16, 2010

(65) Prior Publication Data
US 2011/0310946 A1    Dec. 22, 2011

(30) Foreign Application Priority Data
Mar. 9, 2009    (JP) .................. 2009-055450

(51) Int. Cl.
*H04L 27/00* (2006.01)
(52) U.S. Cl.
USPC ............. 375/299; 375/295; 332/106; 341/20; 341/173
(58) Field of Classification Search
USPC ........................................................ 375/299
See application file for complete search history.

(56) References Cited

U.S. PATENT DOCUMENTS

| 6,205,410 | B1 * | 3/2001 | Cai ............................... 702/191 |
| 8,306,473 | B2 * | 11/2012 | Anreddy et al. ................ 455/39 |
| 8,379,742 | B2 * | 2/2013 | Pham et al. ................... 375/260 |
| 2002/0089451 | A1 * | 7/2002 | Wang et al. ................... 342/458 |
| 2005/0135324 | A1 * | 6/2005 | Kim et al. ..................... 370/343 |
| 2006/0285585 | A1 * | 12/2006 | Sampath ....................... 375/227 |
| 2008/0123601 | A1 * | 5/2008 | Malladi et al. ................ 370/335 |
| 2009/0041139 | A1 * | 2/2009 | Cho et al. ...................... 375/260 |
| 2009/0052512 | A1 * | 2/2009 | Kim et al. ..................... 375/227 |

(Continued)

FOREIGN PATENT DOCUMENTS

| JP | 2008526137 | A | 7/2008 |
| JP | 2008544653 | A | 12/2008 |
| JP | 2008547285 | A | 12/2008 |
| WO | 2007051154 | A | 5/2007 |

OTHER PUBLICATIONS

International Search Report for PCT/JP2010/053716 mailed May 18, 2010.

(Continued)

*Primary Examiner* — Chieh Fan
*Assistant Examiner* — Santiago Garcia
(74) *Attorney, Agent, or Firm* — Sughrue Mion, PLLC

(57) ABSTRACT

A rank estimation device in which a load on a rank estimation process can be reduced is provided.
The rank estimation device of the exemplary embodiment is characterized by comprising a SNR estimation section which calculates a communication quality value, a channel variation estimation section which calculates a variation value that varies at a receiver, and a simplified rank estimation section which estimates a transmission rank based on the communication quality value calculated by the SNR estimation section and the variation value calculated by the channel variation estimation section.

9 Claims, 11 Drawing Sheets

(56) References Cited

U.S. PATENT DOCUMENTS

2009/0092072 A1* 4/2009 Imamura et al. .............. 370/315
2009/0201872 A1* 8/2009 Gorokhov et al. ............ 370/329
2009/0207093 A1* 8/2009 Anreddy et al. .............. 343/876
2010/0329379 A1* 12/2010 Pham et al. .................. 375/267

OTHER PUBLICATIONS

Nortel, "System Level Simulation of Adaptive MIMO for High Speed UE", 3GPP, TSG-RAN WG1#51bis, R1-080383, Jan. 14-18, 2008. Cited in JP Office Action.

Nortel, "System Level Simulation of Adaptive MIMO for High Speed UE", 3GPP, TSG-RAN WG1#51, R1-074645, Nov. 5-9, 2007. Cited in JP Office Action.

Nortel, "Discussion on Rank Adaptation Based on Shadowing for High Speed UEs", 3GPP, TSG-RAN Working Group 1 Meeting #50, R1-073296, Aug. 20-24, 2007, [Internet]<URL:http://www.3gpp.org/ftp/tsg_ran/WG1_RL1/TSGR1_50/Docs/R1-073296.zip>. Cited in JP Office Action.

X. Wang, S. Konishi, T. Suzuki, "Rank Prediction with Consideration of Transmit Diversity for MIMO Design", The Institute of Electronics, Information and Communication Engineers, IEICE Technical Report, RCS2007-233, Mar. 2008, pp. 281-286. Cited in JP Office Action.

Japanese Office Action for JP Application No. 2011-503798 mailed on Nov. 26, 2013 with Partial English Translation.

* cited by examiner

Fig.5

```
Input: SNR, CHANNEL VARIATION VALUE: ν
Output: ESTIMATION RANK: R

IF ν - κ × SNR > TH_RANK 1
   R=1;
ELSE IF ν - κ × SNR < TH_RANK 2
   R=2;
ELSE
   R=Error;

OUTPUT(R);
```

Fig.9

```
Input: SNR, TRAVELING SPEED: α
Output: ESTIMATION RANK: R

IF α − κ' × SNR > TH_RANK 1
    R=1;
ELSE IF α − κ' × SNR < TH_RANK 2
    R=2;
ELSE
    R=Error;

OUTPUT(R);
```

Fig.10

```
Input: SNR, CHANNEL VARIATION VALUE: ν, TRAVELING SPEED: α
Output: ESTIMATION RANK: R IF ν + κ_1" × α − κ_2" × SNR > TH_RANK 1
    R=1;
ELSE IF ν + κ_1" × α − κ_2" × SNR < TH_RANK 2
    R=2;
ELSE
    R=Error;

OUTPUT(R);
```

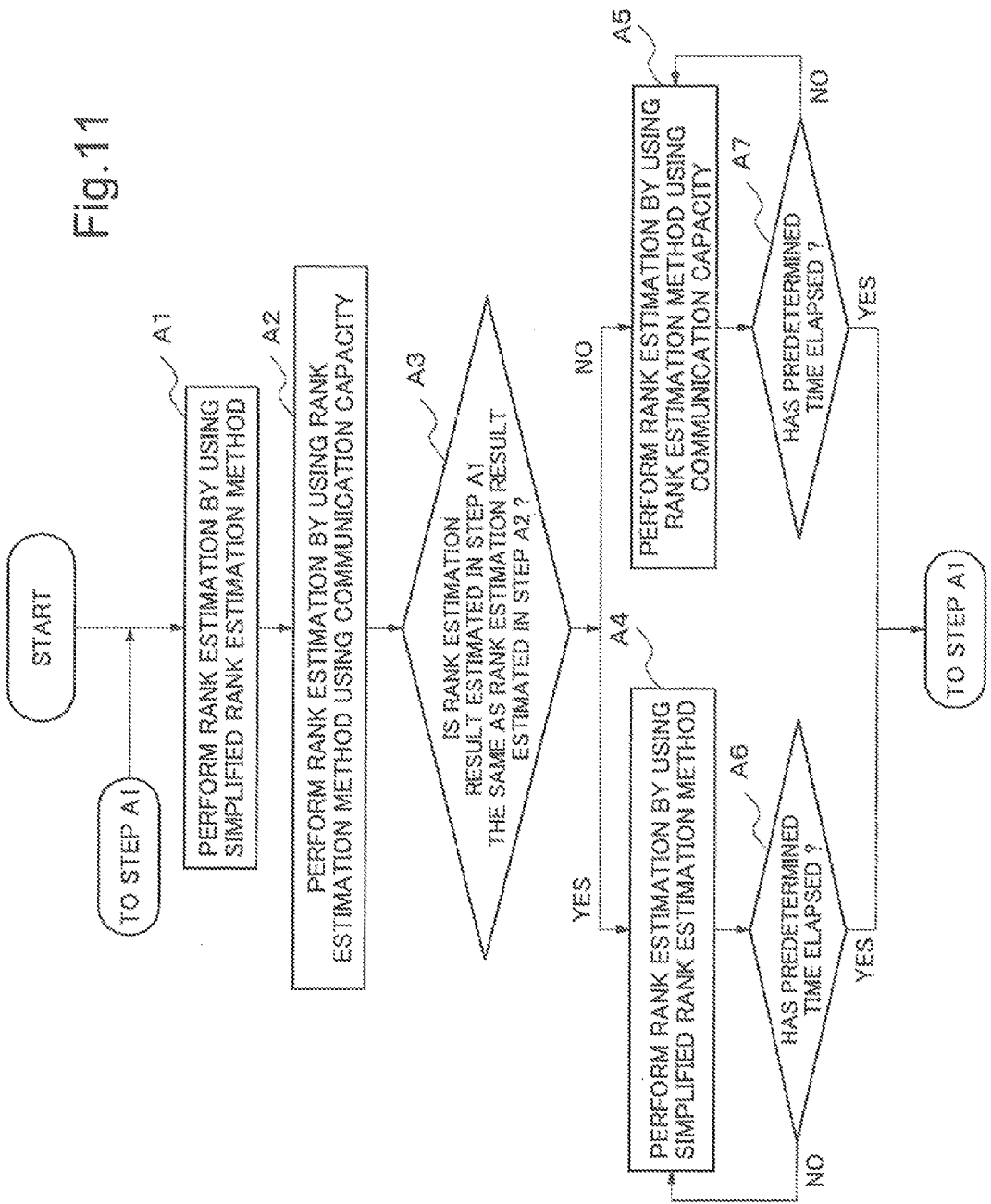

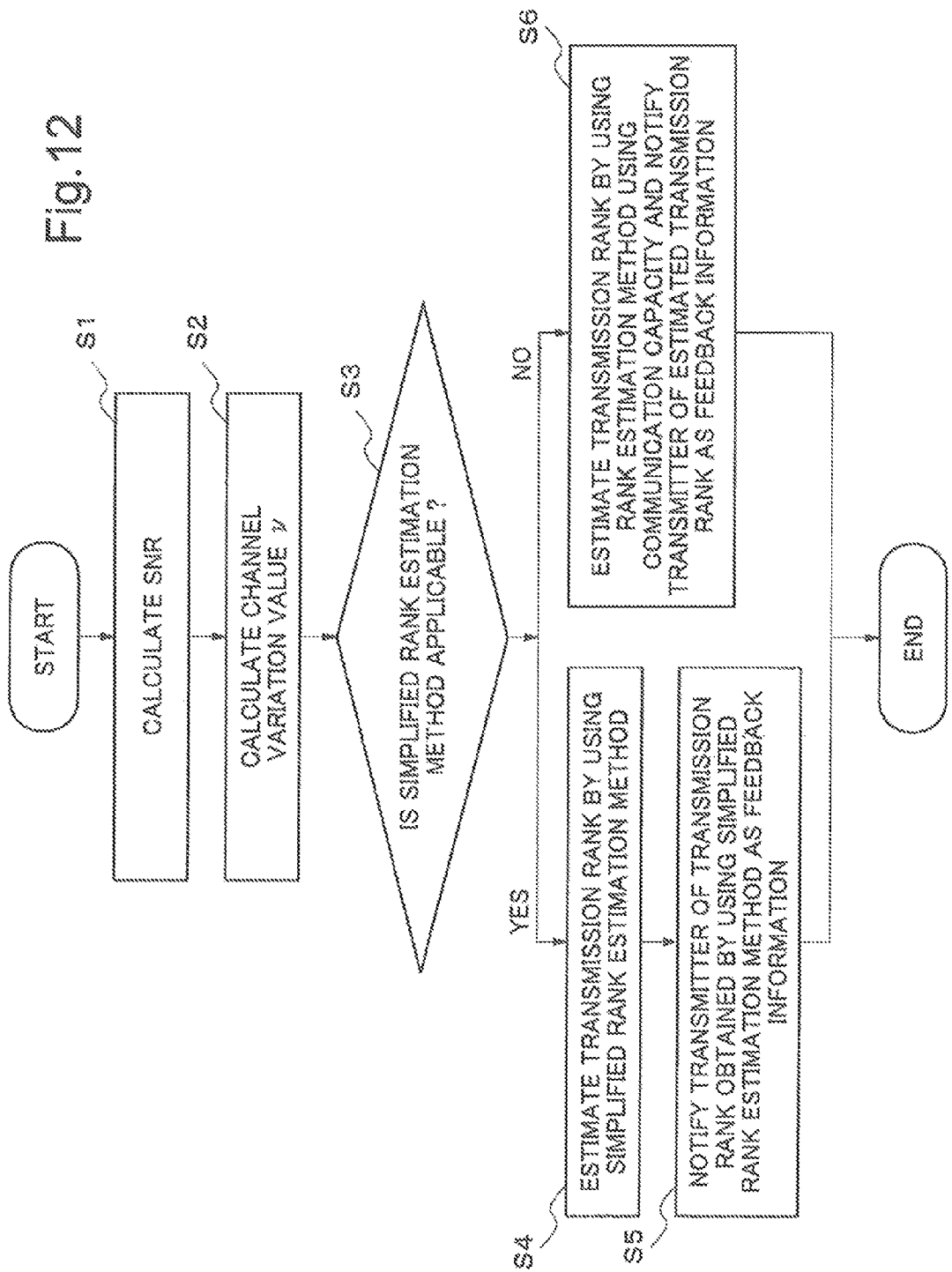

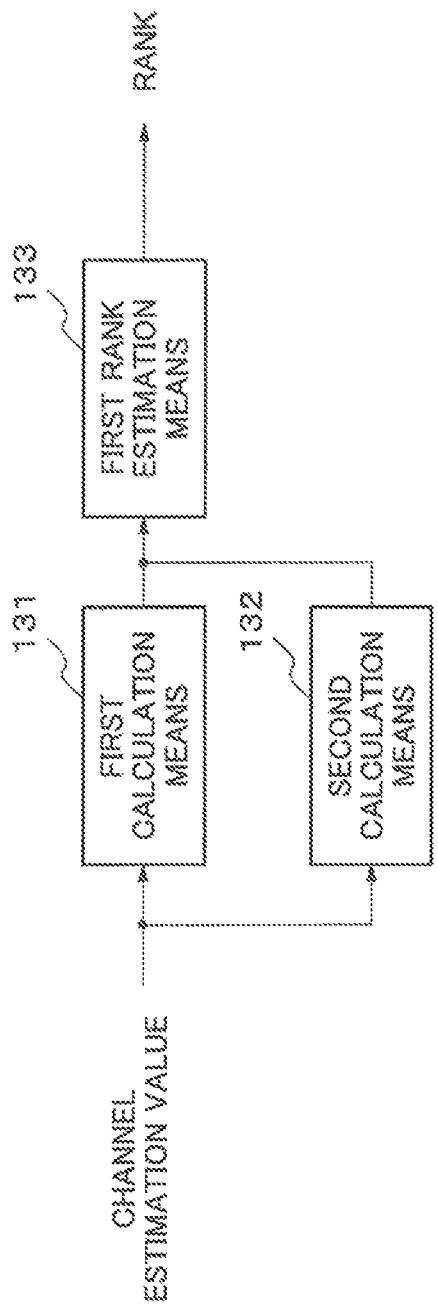

RANK ESTIMATION DEVICE, RECEIVER, COMMUNICATION SYSTEM, RANK ESTIMATION METHOD, AND PROGRAM RECORDING MEDIUM

TECHNICAL FIELD

The present invention relates to a rank estimation device, a receiver, a communication system, a rank estimation method, and a program recording medium.

BACKGROUND ART

A MIMO (Multiple Input Multiple Output) OFDM (Orthogonal Frequency Division Multiplexing) system such as an LTE (Long Term Evolution) or the like standardized by the 3GPP (3rd Generation Partnership Project) is attracting attention as a next generation communication system.

In the MIMO-OFDM system, a transmission rank most suitable for data transmission is estimated at a receiver side, the estimated transmission rank is fed back to a transmitter, and data is transmitted at a transmitter side according to the transmission rank fed back from the receiver side. As a result, maximum throughput at the receiver can be obtained.

For example, patent document 1 is a technical literature in which a technical content for estimating the above mentioned transmission rank is disclosed.

In patent document 1, a technique with which a communication capacity between a transmitter and a receiver is calculated for all the ranks and the rank of which the maximum communication capacity can be obtained is selected is disclosed.

PRIOR ART DOCUMENT

Patent Document

Patent document 1 Published Japanese translations of PCT international publication for patent application No. 2008-526137

DISCLOSURE OF THE INVENTION

Problems to be Solved by the Invention

A process for calculating the communication capacity requires a large amount of calculation. In the technology disclosed in the above-mentioned patent document 1, the communication capacity between a transmitter and a receiver is calculated for all the ranks. Therefore, a large amount of load is generated on a rank estimation process. As a result, a problem in which large amount of permitted time and power for the receiver is consumed occurs.

The present invention is made in view of the above described situation. The object of the present invention is to provide a rank estimation device, a receiver, a communication system, a rank estimation method, and a program, which can reduce the load on the rank estimation process that is the above-mentioned problem.

Means for Solving the Problems

In order to achieve the above-mentioned object, the present invention has the following features.

<Rank Estimation Device>

A rank estimation device according to the present invention is characterized by including a first calculation means for calculating a communication quality value, second calculation means for calculating a variation value that varies at a receiver, and a first rank estimation means for estimating a transmission rank based on the communication quality value calculated by the first calculation means and the variation value calculated by the second calculation means.

<Receiver>

A receiver according to the present invention is characterized by being mounted with the above-mentioned rank estimation device.

<Communication System>

A communication system according to the present invention which is comprised of a transmitter and a receiver is characterized in that the receiver includes a first calculation means for calculating a communication quality value, a second calculation means for calculating a variation value that varies at the receiver, and a first rank estimation means for estimating a transmission rank based on the communication quality value calculated by the first calculation means and the variation value calculated by the second calculation means.

<Rank Estimation Method>

A rank estimation method according to the present invention is characterized by including a first calculation step in which a communication quality value is calculated, a second calculation step in which a variation value that varies at a receiver is calculated, and a first rank estimation step in which a transmission rank based on the communication quality value calculated in the first calculation step and the variation value calculated in the second calculation step is estimated.

<Program>

A program according to the present invention is characterized by causing a computer to perform a first calculation process in which a communication quality value is calculated, a second calculation process in which a variation value that varies at a receiver is calculated, and a first rank estimation process in which a transmission rank based on the communication quality value calculated in the first calculation process and the variation value calculated in the second calculation process is estimated.

Advantage of the Invention

By using the present invention, the load on the rank estimation process can be reduced.

BRIEF DESCRIPTION OF THE DRAWINGS

FIG. 5 is a figure showing an algorithm for determining whether a transmission rank can be estimated by using a simplified rank estimation technique.

FIG. 9 is a figure showing an algorithm for estimating a transmission rank by using SNR and a traveling speed a of a receiver.

FIG. 10 is a figure showing an algorithm for estimating a transmission rank by using a SNR (Signal to Noise power Ratio), a channel variation value v, and a traveling speed α of a receiver.

FIG. 11 is a chart showing a process operation in which a rank estimation technique is switched to either a simplified rank estimation technique or a rank estimation technique using a communication capacity.

FIG. 12 is a chart showing another example of a process operation of a rank estimation unit (30).

FIG. 13 is a diagram showing an example of an internal configuration of a rank estimation unit (30).

BEST MODE FOR CARRYING OUT THE INVENTION

Outline of Communication System

Figure 1:
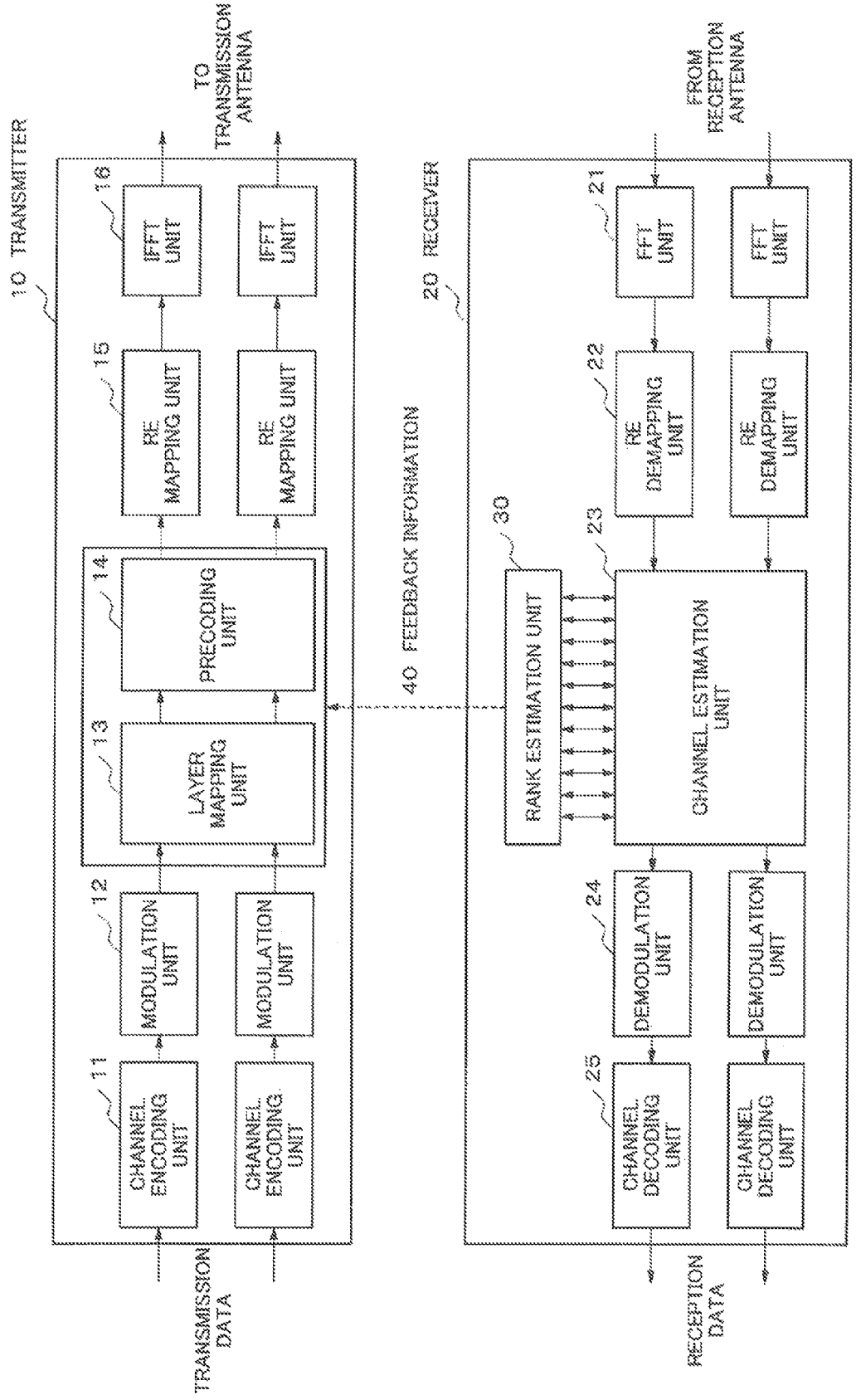
FIG. 1 is a diagram showing an example of a system configuration of a communication system of the exemplary embodiment.

First, an outline of a communication system of the exemplary embodiment will be described with reference to FIG. 1 and FIG. 2. FIG. 1 shows an example of a system configuration of the communication system of the exemplary embodiment and FIG. 2 is a diagram showing an example of an internal configuration of a receiver (20) side of which the communication system is comprised.

As shown in FIG. 1, the communication system of the exemplary embodiment is comprised of a transmitter (10) and a receiver (20).

Figure 2:
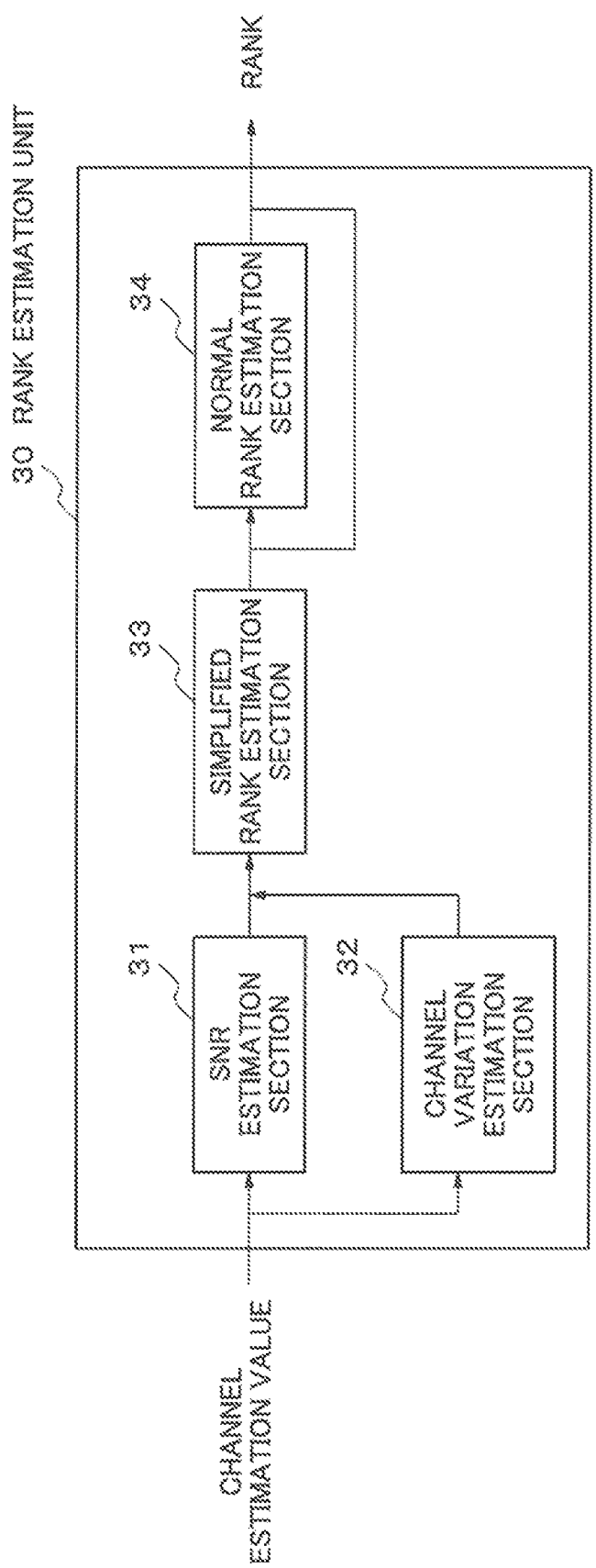
FIG. 2 is a diagram showing an example of an internal configuration of a rank estimation unit (30).

As shown in FIG. 2, the receiver (20) of the exemplary embodiment is characterized by including first calculation means (correspond to a SNR estimation section (31)) for calculating the communication quality value and second calculation means (correspond to a channel variation estimation section 32) for calculating the variation value that varies at the receiver (20). Further, the receiver (20) of the exemplary embodiment is characterized by including first rank estimation means (correspond to a simplified rank estimation section (33)) for estimating a transmission rank based on the communication quality value calculated by the first calculation means (31) and the variation value calculated by the second calculation means (32).

By using these means, in the communication system of the exemplary embodiment, the load on the rank estimation process performed at the receiver (20) side can be reduced. The communication system of the exemplary embodiment will be described in detail below with reference to the attached drawing. Further, in the following description, the LTE standardized in the 3GPP will be explained as an example. However, the exemplary embodiment is not limited to only the LTE.

<Example of a System Configuration of the Communication System>

First, an example of the system configuration of the communication system of the exemplary embodiment will be described with reference to FIG. 1.

The communication system of the exemplary embodiment is comprised of the transmitter (10) and the receiver (20).

The transmitter (10) is comprised of a channel encoding unit (11), a modulation unit (12), a layer mapping unit (13), a precoding unit (14), a RE (Resource Element) mapping unit (15), and an IFFT (Inverse Fast Fourier Transform) unit (16).

The receiver (20) is comprised of a FFT (Fast Fourier Transform) unit (21), a RE demapping unit (22), a channel estimation unit (23), a rank estimation unit (30), a demodulation unit (24), and a channel decoding unit (25).

<Example of a Configuration of the Rank Estimation Unit (30)>

Next, an example of the configuration of the rank estimation unit (30) of the exemplary embodiment will be described with reference to FIG. 2.

The rank estimation unit (30) is comprised of a SNR (Signal to Noise power Ratio) estimation section (31), a channel variation estimation section (32), a simplified rank estimation section (33), and a normal rank estimation section (34).

<Process Operation of the Communication System>

Next, the process operation of the communication system of the exemplary embodiment will be described with reference to FIG. 1 and FIG. 2.

<Process Operation on a Transmitter (10) Side>

First, the process operation on the transmitter (10) side will be described.

On the transmitter (10) side, transmission data is error-detection-encoded and error-correction-encoded in the channel encoding unit (11) and mapped to an I component and a Q component based on a modulation method specified in advance in the modulation unit (12).

The data modulated by the modulation unit (12) is mapped to a transmission layer by the layer mapping unit (13) based on feedback information (40) reported by the receiver (20). After that, the precoding unit (14) multiplies the modulated data by a precoding matrix specified in advance.

Next, it is mapped to the RE on a frequency resource by the RE mapping unit (15), converted into a signal in a time domain by the IFFT unit (16), and transmitted from a transmission antenna as a transmission signal.

<Process Operation on the Receiver (20) Side>

Next, the process operation on the receiver (20) side will be described.

On the receiver (20) side, a received signal received by a reception antenna is divided into data of a frequency component by the Fourier transform in the FFT unit (21) and demapped from the frequency resource by the RE demapping unit (22).

The channel estimation unit (23) estimates a channel estimation matrix that represents a channel state by using a known signal (Reference Signal) mapped on the frequency resource in advance. In the decoding unit (24), the I component and the Q component are demodulated to likelihood information based on the received signal, the channel estimation matrix estimated by the channel estimation unit (23), and the like, and in the channel decoding unit (25), an error correction decoding and an error detection are performed.

Additionally, in the rank estimation unit (30) in the receiver (20), the most suitable transmission rank is estimated based on the channel estimation matrix estimated by the channel estimation unit (23) and the estimated transmission rank is reported to the transmitter (10) as the feedback information (40). The feedback information (40) is reflected in a process by the layer mapping unit (13) in the transmitter (10).

<Process Operation of the Rank Estimation Unit (30)>

Figure 3:
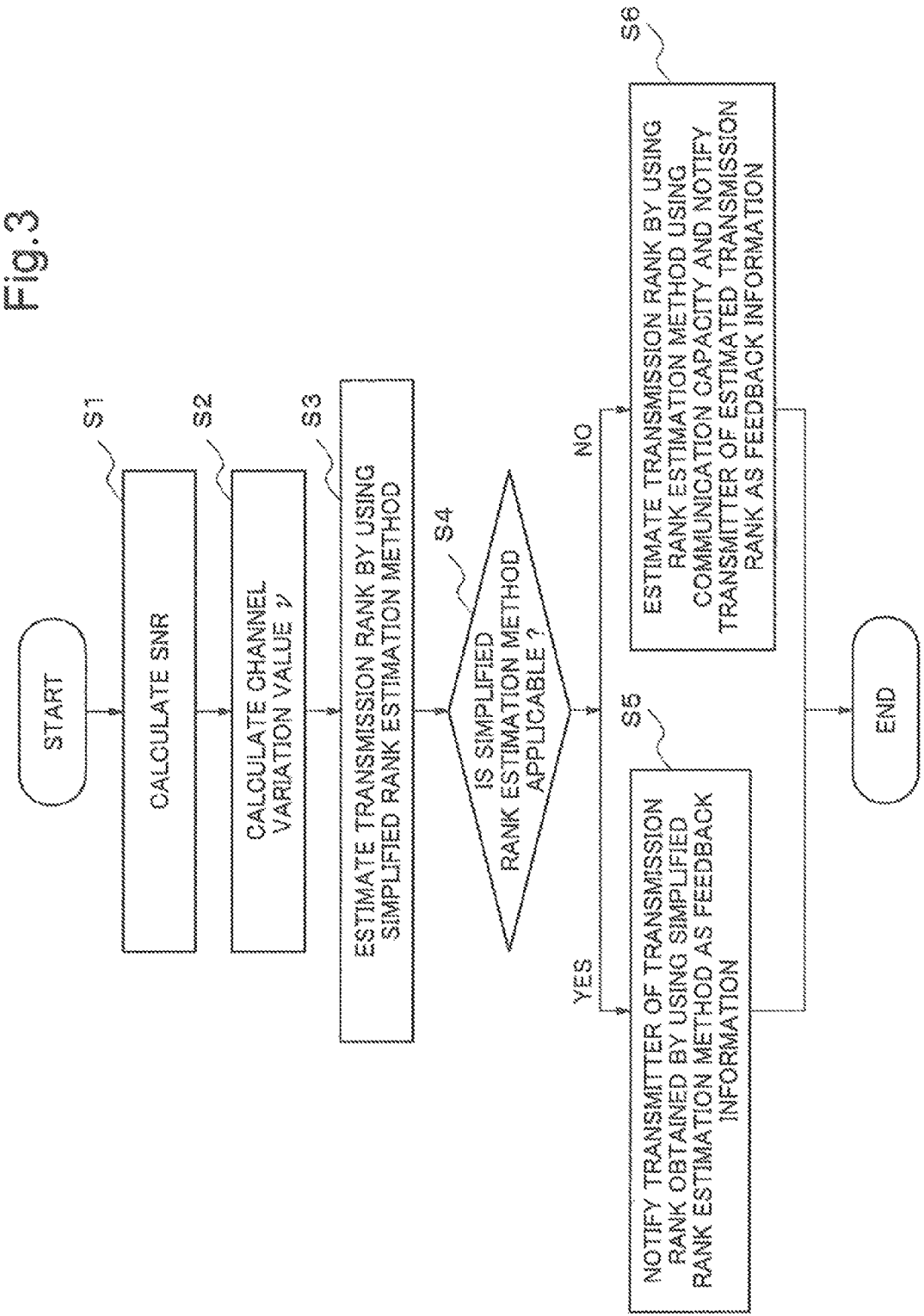
FIG. 3 is a chart showing an example of a process operation of a rank estimation unit (30).

Next, the process operation of the rank estimation unit (30) will be described with reference to FIG. 2 and FIG. 3.

In the following description, an open loop spatial multiplexing with two transmission antennas will be described as an example.

The channel estimation matrix calculated by the channel estimation unit (23) is outputted to the rank estimation unit (30).

The SNR estimation section (31) of the rank estimation unit (30) calculates an SNR (Sinai to Noise power Ratio) that is an index representing, a reception quality of each subband and the entire band based on the channel estimation matrix calculated by the channel estimation unit (23) (step S1). The subband is obtained by dividing the entire band and each subband has a fixed bandwidth.

The channel variation estimation section (32) calculates a channel variation value ν which indicates the degree of variation of the channel estimation value as the variation value that varies at the receiver based on the channel estimation matrix calculated by the channel estimation unit (23) (step S2). Further, here, the channel variation value ν is used as the variation value that varies at the receiver. However, a traveling speed of the receiver or the like may be used as mentioned later.

Figure 4:
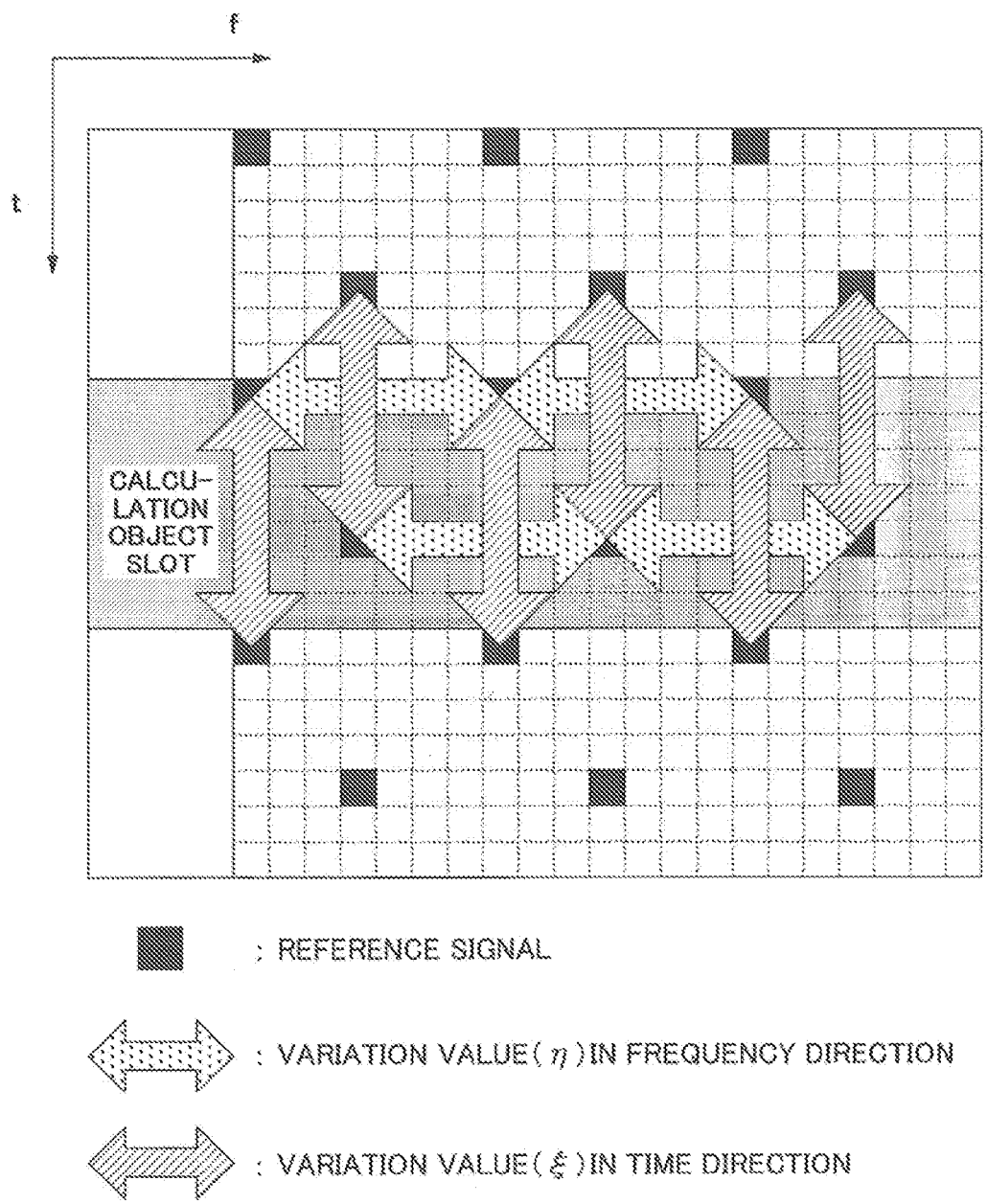
FIG. 4 is a figure showing a method for calculating a channel variation value v.

The channel variation value ν can be calculated as a sum of the variation value (ξ) in a time domain of the channel estimation value and the variation value (η) in a frequency domain. An image of a method for calculating the channel variation value ν is shown in FIG. 4.

The channel variation estimation section (32) calculates the variation value (ξ) in a time domain as follows.

$$\xi(n, t = 0) = \frac{1}{N_{rx}N_{tx}N_{RS}}$$

$$\sum_{a=0}^{N_{rx}-1} \sum_{b=0}^{N_{tx}-1} \sum_{i=0}^{N_{RS}-1} |h_{ZF}(a, b, n, t = 4, i) - h_{ZF}(a, b, n-1, t = 4, i)|^2,$$

$$\xi(n, t = 4) = \frac{1}{N_{rx}N_{tx}N_{RS}}$$

$$\sum_{a=0}^{N_{rx}-1} \sum_{b=0}^{N_{tx}-1} \sum_{i=0}^{N_{RS}-1} |h_{ZF}(a, b, n, t = 0, i) - h_{ZF}(a, b, n-1, t = 0, i)|^2,$$

$$\xi(n) = \frac{1}{2}\{\xi(n, t = 0) + \xi(n, t = 4)\},$$

where "a" is an index number of the reception antenna, "b" is an index number of the transmission antenna, "n" is a slot number, "t" is a symbol number, and "i" is an index number of the reference signal. Additionally, "$h_{ZF}$" is a channel estimation value after ZF (Zero Forcing), "$N_{RS}$" is the number of the reception antennas, "$N_{tx}$" is the number of transmission antennas, and "$N_{RS}$" is the number of reference signals included in the band.

The channel variation estimation section (32) calculates the variation value (η) in the frequency domain as follows.

$$\eta(n, t = 0) = \frac{1}{N_{rx}N_{tx}(N_{RS} - 1)}$$

$$\sum_{a=0}^{N_{rx}-1} \sum_{b=0}^{N_{tx}-1} \sum_{i=0}^{N_{RS}-2} |h_{ZF}(a, b, n, t = 0, i) - h_{ZF}(a, b, n, t = 0, i+1)|^2$$

$$\eta(n, t = 4) = \frac{1}{N_{rx}N_{tx}(N_{RS} - 1)}$$

-continued $$\sum_{a=0}^{N_{rx}-1} \sum_{b=0}^{N_{tx}-1} \sum_{i=0}^{N_{RS}-2} |h_{ZF}(a, b, n, t = 4, i) - h_{ZF}(a, b, n, t = 4, i+1)|^2$$

$$\eta(n) = \frac{1}{2}\{\eta(n, t = 0) + \eta(n, t = 4)\}$$

The channel variation estimation section (32) calculates the channel variation value ν by using the variation value (ξ) in the time domain and the variation value (η) in the frequency domain that are calculated in the above-mentioned process as follows.

$$\nu(n)=\eta(n)+\lambda\times\xi(n),$$

where "λ" is a weighting coefficient.

The simplified rank estimation section (33) estimates the transmission rank by using a simplified rank estimation technique based on the SNR of the entire band calculated by the SNR estimation section (31) and the channel variation value ν calculated by the channel variation estimation section (32) (step S3).

The simplified rank estimation section (33) determines whether the transmission rank can be estimated by using the simplified rank estimation technique (step S4).

When it is determined that the transmission rank can be estimated by using the simplified rank estimation technique, the simplified rank estimation section (33) notifies the transmitter (10) of the transmission rank estimated by using the simplified rank estimation technique as the feedback information (40) (step S5).

An algorithm for determining whether the transmission rank can be estimated by using the simplified rank estimation technique is shown in FIG. 5.

According to the algorithm shown in FIG. 5, the SNR of the entire band calculated by the SNR estimation section (31) and the channel variation value ν calculated by the channel variation estimation section (32) are substituted in the following equation (1) (Input; SNR, the channel variation value ν). Where, "κ" is a weighting coefficient.

$$\nu - \kappa \times SNR \qquad \text{equation (1)}$$

When the value obtained by the above-mentioned equation (1) is greater than a predetermined threshold value $TH_{RANK}1$ ($\nu-\kappa\times SNR>TH_{RANK}1$), the transmission rank R=1 is outputted.

When the value obtained by the above-mentioned equation (1) is smaller than a predetermined threshold value $TH_{RANK}2$ ($\nu-\kappa\times SNR>TH_{RANK}2$), the transmission rank R=2 is outputted.

When the above mentioned conditions are not satisfied, the transmission rank R="Error" is outputted.

Therefore, according to the algorithm shown in FIG. 5, when the SNR of the entire band calculated by the SNR estimation section (31) is low and the channel variation value ν calculated by the channel variation estimation section (32) is large (a reception condition of the receiver is poor), the transmission rank 1 is outputted.

When the SNR of the entire band calculated by the SNR estimation section (31) is high and the channel variation value ν calculated by the channel variation estimation section (32) is small (a reception condition of the receiver is good), the transmission rank 2 is outputted.

Figure 6:
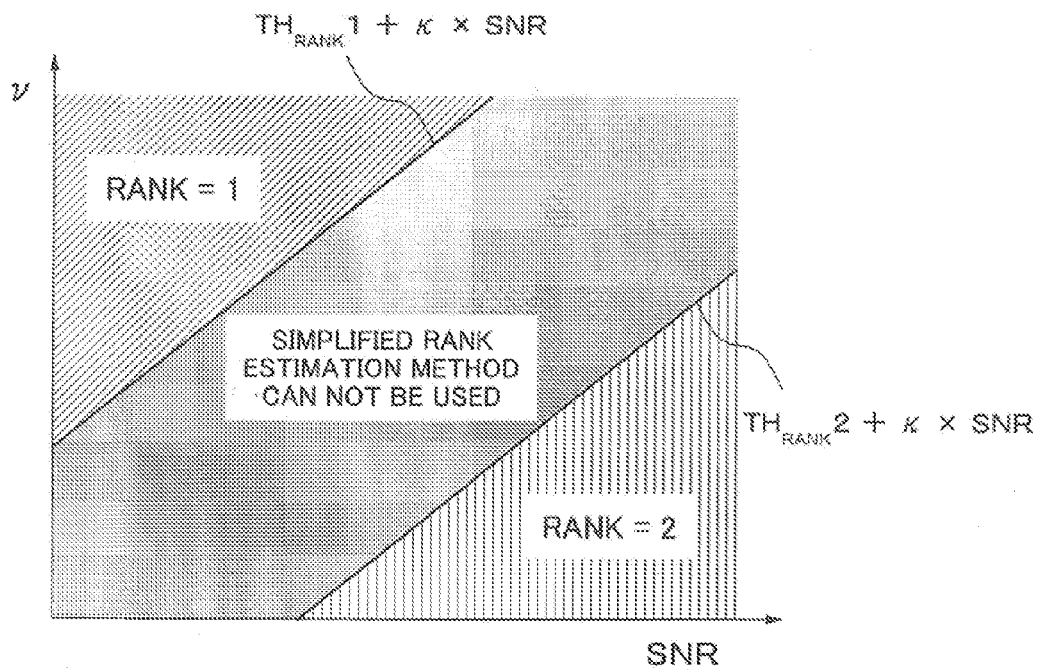
FIG. 6 is a figure showing an image of an output result of an algorithm shown in FIG. 5.

When the transmission rank does not belong to the transmission rank 1 and the transmission rank 2, information ("Error") indicating that the estimation of the transmission rank cannot be performed by the simplified rank estimation method is outputted. The reason why the "Error" is outputted is because there is a great possibility that the characteristic is deteriorated when the transmission rank is estimated by using the simplified rank estimation technique. An image of the output result of the algorithm shown in FIG. 5 is shown in FIG. 6.

When the simplified rank estimation section (33) determines that it is impossible to perform the estimation of the transmission rank (in other words, when the output of the simplified rank estimation section (33) is the "Error"), the normal rank estimation section (34) estimates the transmission rank by using the rank estimation technique using a communication capacity. After that, the rank estimation unit (30) notifies the transmitter (10) of the estimated transmission rank as the feedback information (40) (step S6).

The normal rank estimation section (34) calculates an effective SNR which indicates the SNR when each rank is applied by using the following equation.

$$SINR(R, l, f, K) = \frac{SNR(K)}{[SNR(K)^{-1}I_R + V_R^H H(f)^H H(f) V_R]_{l,l}^{-1}} - 1,$$

where "l" is a layer number, "f" is a subcarrier number to which the reference signal on a frequency axis is mapped, and "K" is a subband number. "$I_R$" is a unit matrix with R rows and columns, "$V_R$" is a precoding matrix to which the rank R is applied, and "H (f)" is the channel estimation value in an f-th subcarrier. "$[\ ]_{l,l}$" is an element at 1-th row and 1-th column of the matrix. Further, the $V_R$ is specified in the 3GPP TS 36.211 v8.4.0 as shown in table 1.

| rank | $V_R$ |
|---|---|
| 1 | $V_R = \frac{1}{\sqrt{2}}\begin{bmatrix}1\\1\end{bmatrix}$ |
| 2 | $V_R = WD(i)U$ where $W = \frac{1}{\sqrt{2}}\begin{bmatrix}1 & 0\\0 & 1\end{bmatrix}, D(i) = \begin{bmatrix}1 & 0\\0 & e^{-j2\pi i/2}\end{bmatrix}, U = \frac{1}{\sqrt{2}}\begin{bmatrix}1 & 1\\1 & -1\end{bmatrix}$ |

The normal rank estimation section (34) calculates a communication capacity C (R) between the transmitter (10) and the receiver (20) from the effective SNR obtained in the above-mentioned process by using the following equation and estimates the transmission rank R with which the communication capacity C (R) becomes maximum.

$$C(R) = \frac{1}{N_{RS}(K)} \sum_K^{N_S} \sum_{l=1}^R \sum_{f_K}^{N_{RS}} \log_2(1 + SNR(R, l, f_K, K))$$

$$R = \underset{R \in \{1,2\}}{\arg\max} C(R),$$

where "$N_s$" is the number of subbands included in the band.

<Another Example of the Process Operation of the Rank Estimation Unit (30)>

In the above-mentioned description for the rank estimation unit (30), the transmission rank is estimated by the simplified rank estimation section (33) by using the simplified rank estimation technique (step S3) and after that, it is determined whether the transmission rank can be estimated by using the simplified rank estimation technique (step S4).

The steps shown in FIG. 12 may be used. Namely, after the channel variation value v is calculated (step S2), the simplified rank estimation section (33) determines whether the transmission rank can be estimated by using the simplified rank estimation technique (step S3).

When it is determined that the transmission rank can be estimated by using the simplified rank estimation technique, the simplified rank estimation section (33) estimates the transmission rank by using the simplified rank estimation technique based on the SNR of the entire band and the channel variation value v (step S4).

After that, the simplified rank estimation section (33) notifies the transmitter (10) of the transmission rank estimated by using the simplified rank estimation technique as the feedback information (40) (step S5).

<Operation and Effect of the Communication System of the Exemplary Embodiment>

Thus, the rank estimation unit (30) of the exemplary embodiment estimates the transmission rank by using the simplified rank estimation technique in the simplified rank estimation section (33) based on the SNR of the entire band calculated by the SNR estimation section (31) and the channel variation value v calculated by the channel variation estimation section (32). Because each index used by the simplified rank estimation technique is a parameter required in the other processes of the receiver (10), the calculation process for calculating these values does not contribute to the calculation overhead of the receiver (10). Accordingly, when the transmission rank can be estimated by using the simplified rank estimation technique in the simplified rank estimation section (33), the load on the process of estimating the transmission rank can be reduced. When the transmission rank cannot be estimated by using the simplified rank estimation technique, the rank estimation unit (30) of the exemplary embodiment estimates the transmission rank by the rank estimation technique using the communication capacity. As a result, when there is a great possibility that the characteristic is deteriorated, the rank estimation is performed by using the rank estimation technique that uses the communication capacity and whereby, deterioration of the rank estimation accuracy can be avoided. As mentioned above, because the rank estimation method is switched by the rank estimation unit (30) of the exemplary embodiment according to the variation of the channel state, the load on the average rank estimation process can be reduced while preventing the deterioration of the rank estimation accuracy.

Second Exemplary Embodiment

Next, a second exemplary embodiment will be described.

In the first exemplary embodiment, the rank estimation in the simplified rank estimation technique is performed by using the fixed threshold values ($TH_{RANK}1$ and $TH_{RANK}2$) as shown in FIG. 6. However, the rank estimation can be performed by using unfixed threshold values ($TH_{RANK}1'$, $TH_{RANK}2'$) that varies according to for example, the SNR and the value of v instead of the fixed values as shown in FIG. 7.

Third Exemplary Embodiment

Next, a third exemplary embodiment will be described.

Figure 7:
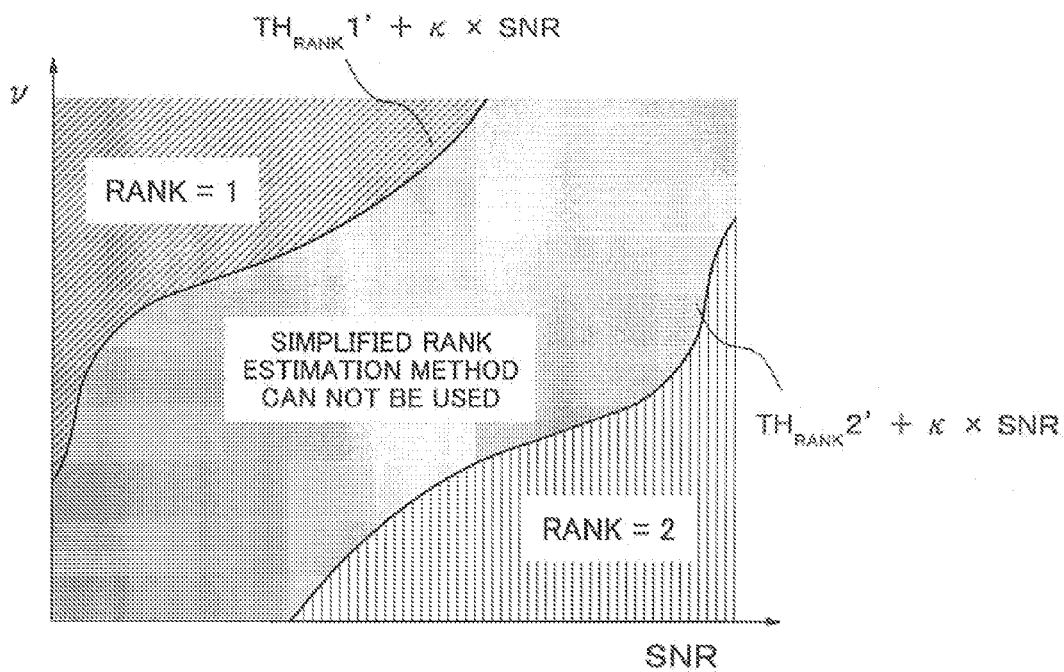
FIG. 7 is a figure showing a case in which variable threshold values ($TH_{RANK}1'$, $TH_{RANK}2'$) are used.
Figure 8:
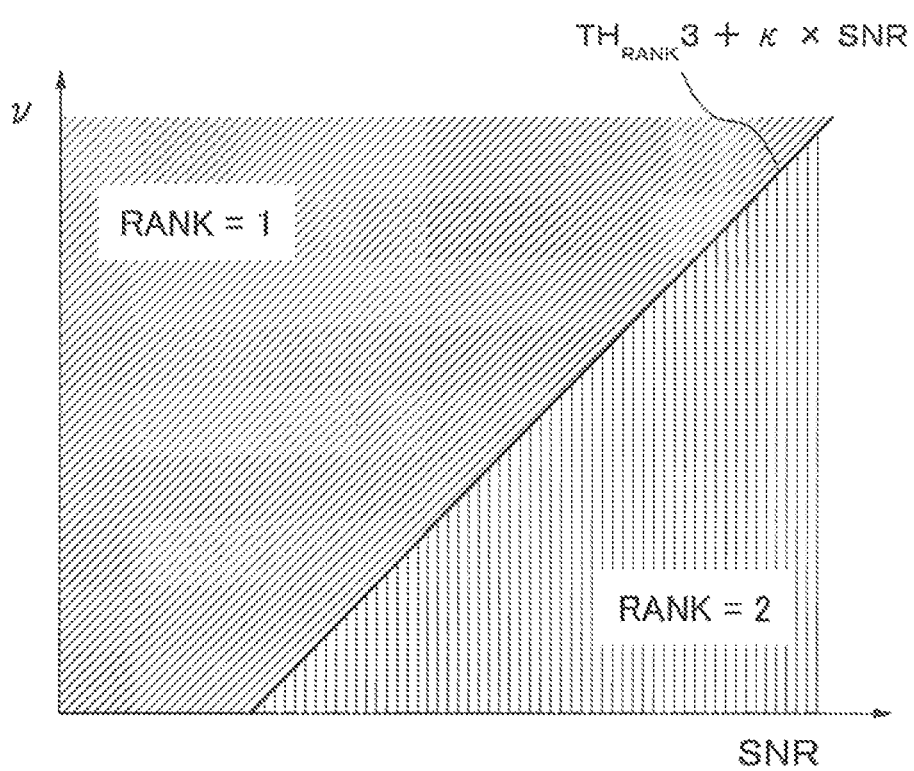
FIG. 8 is a figure showing a case in which a rank estimation is performed by using only a simplified rank estimation technique.

In the above-mentioned exemplary embodiment, as shown in FIG. 6 and FIG. 7, the transmission rank is classified into three ranks: rank=1, rank=2, and undecidable (the simplified rank estimation technique cannot be used). However, for example, as shown in FIG. 8, a method in which the transmission rank is classified into two ranks: rank=1 and rank=2, and the rank estimation is performed by using only the simplified rank estimation technique without using the rank estimation technique using the communication capacity can be used. In this case, the threshold value ($TH_{RANK}3$) that determines the rank may be linear or nonlinear as shown in FIG. 8.

Fourth Exemplary Embodiment

Next, a fourth exemplary embodiment will be described.

In the first to third exemplary embodiments mentioned above, the rank estimation is performed by using the indices that are the reception quality represented by the SNR and the channel variation value v. However, another index such as a traveling speed a of the receiver can be used instead of the channel variation value v. In this case, the algorithm shown in FIG. 5 is changed to the algorithm shown in FIG. 9. Where "κ'''" is the weighting coefficient. Thus, the transmission rank can be estimated by using the SNR and the traveling speed a of the receiver. In other words, the transmission rank can be estimated by using the variation value that varies at the receiver such as the channel variation value v, the traveling speed of the receiver, or the like. Further, the transmission rank can be estimated by combining all the indices: the SNR, the channel variation value v, and the traveling speed α of the receiver. In this case, the algorithm shown in FIG. 5 is changed to the algorithm shown in FIG. 10. Where "κ1" and "κ2" are the weighting coefficients.

Fifth Exemplary Embodiment

Next, a fifth exemplary embodiment will be described.

In the first exemplary embodiment, when the transmission rank cannot be estimated by using the simplified rank estimation technique in the simplified rank estimation section (33), the transmission rank is estimated by the rank estimation technique using the communication capacity. However, as shown in FIG. 11, the transmission rank can be estimated by switching the rank estimation technique to either the simplified rank estimation technique or the rank estimation technique using the communication capacity.

In FIG. 11, the rank estimation unit (30) performs the rank estimation by using the simplified rank estimation technique (step A1) and also performs the rank estimation by using the rank estimation technique using the communication capacity (step A2).

Next, the rank estimation unit (30) determines whether the estimation result (estimation rank) estimated in step A1 is the same as the estimation result (estimation rank) estimated in step A2 (step A3).

When the estimation result estimated in step A1 is the same as the estimation result estimated in step A2 (step A3/Yes), the rank estimation unit (30) switches the rank estimation technique to the simplified rank estimation technique and performs the successive rank estimation process by using the simplified rank estimation technique (step A4).

When the estimation result estimated in step A1 is not the same as the estimation result estimated in step A2 (step A3/No), the rank estimation unit (30) switches the rank estimation technique to the rank estimation technique using the communication capacity. After that, the rank estimation unit (30) performs the successive rank estimation process by using the rank estimation technique using the communication capacity (step A5).

Thus, the rank estimation unit (30) switches the rank estimation technique to either the simplified rank estimation technique or the rank estimation technique using the communication capacity and performs the successive rank estimation process by using the technique selected by the switching.

When a predetermined time has elapsed from the end of the determination process of step A3 (step A6/Yes, step A7/Yes), the rank estimation unit (30) starts to perform the process of steps A1 and A2, and performs a process for determining whether the estimation results estimated by both techniques are the same once again (step A3).

As a result, the determination process of step A3 is performed at a predetermined time interval, the rank estimation technique is switched to either the simplified rank estimation technique or the rank estimation technique using the communication capacity, and the successive rank estimation process is performed by using the technique selected by the switching.

Further, in the process mentioned above, a process for determining whether the estimation results estimated by two techniques are the same is performed one time (step A3), the rank estimation technique is switched to one of two estimation techniques (step A4 or step A5). However, when a case in which the estimation results estimated by both techniques are the same occurs several times continuously, the rank estimation technique can be switched to the simplified rank estimation technique.

Sixth Exemplary Embodiment

Next, a sixth exemplary embodiment will be described.

As shown in FIG. 13, a rank estimation device of the sixth exemplary embodiment is characterized by including first calculation means (131) for calculating the communication quality value and second calculation means (132) for calculating the variation value of the received signal. Further, the rank estimation device of the exemplary embodiment is characterized by including first rank estimation means (133) for estimating the transmission rank based on the communication quality value calculated by the first calculation means (131) and the variation value calculated by the second calculation means (132).

As a result, because the rank estimation device of the exemplary embodiment estimates the rank without performing the calculation for the communication capacity which needs large calculation amount, the load on the rank estimation process can be reduced.

Here, the first calculation means (131) for calculating the communication quality value shown in FIG. 13 correspond to the SNR estimation section (31) in the first exemplary embodiment and in FIG. 2. The second calculation means (132) for calculating the variation value of the received signal correspond to the channel variation estimation section (32) in the first exemplary embodiment and in FIG. 2. The first rank estimation means (133) shown in FIG. 13 correspond to the simplified rank estimation section (33) in the first exemplary embodiment and in FIG. 2.

Further, the exemplary embodiment mentioned above is the preferred exemplary embodiment of the present invention. The scope of the present invention is not limited to only the above-mentioned exemplary embodiment. Various changes in configuration can be made without departing from the gist of the present invention.

For example, in the exemplary embodiment mentioned above, although a case in which two transmission ranks are used between the transmitter 10 and the receiver 20 has been explained as an example, the similar simplified technique can be applied to a system in which more than one transmission rank can be used.

In the exemplary embodiment mentioned above, the communication system using the LTE has been explained as an example. However, the similar technique can be applied to a wireless communication system such as a mobile phone using MIMO-OFDM and FDM, a PHS (Personal Handy-phone System), a wireless LAN (Local Area Network), or the like.

The rank estimation technique using the communication capacity is not limited to the estimation technique described in the above-mentioned exemplary embodiment. For example, the publicly-known estimation technique such as the estimation technique disclosed in patent document 1 or the like can be used The control operation in each device of the transmitter (10) and the receiver (20) of which the communication system of the exemplary embodiment mentioned above is comprised can be performed by using hardware, software, or a combined configuration of both.

Further, when the process is performed by using software, it is possible to install a program in which a process sequence is recorded in a memory in a computer incorporated in a dedicated hardware and execute the program. Further, it is possible to install the program in a general-purpose computer which can carry out various processes and execute the program.

For example, the program can be recorded in a hard disk or a ROM (Read Only Memory) that is a recording medium in advance. Further, the program can be stored (recorded) in a removable recording medium temporarily or permanently. Such removable recording medium can be provided as so-called packaged software. A floppy (registered trademark) disk, a CD-ROM (Compact Disc Read Only Memory), an MO (Magneto optical) disk, a DVD (Digital Versatile Disc), a magnetic disk, and a semiconductor memory can be used as the removable recording medium.

Further, the program is installed to the computer from the removable recording medium mentioned above. The program is wirelessly transferred from a download site to the computer. The program is transferred to the computer via a network by a wire line.

The transmitter (10) and the receiver (20) of which the communication system of the exemplary embodiment is comprised do not necessarily perform the process in chronological order according to the process operation described in the above-mentioned exemplary embodiment. Namely, the transmitter (10) and the receiver (20) can perform the process in parallel or individually according to a processing ability of the device that performs the process or the needs.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-055450, filed on Mar. 9, 2009 the disclosure of which is incorporated herein in its entirety by reference.

INDUSTRIAL APPLICABILITY

The present invention can be applied to a communication system such as a mobile phone using MIMO-OFDM and FDM, a PHS, a Wireless LAN, or the like.

DESCRIPTION OF SYMBOL 10 transmitter
20 receiver
11 channel encoding unit
12 modulation unit
13 layer mapping unit
14 precoding unit
15 RE mapping unit
16 IFFT unit
21 FFT unit
22 RE demapping unit
23 channel estimation unit
24 demodulation unit
25 channel decoding unit
30 rank estimation unit (rank estimation device)
31 SNR measurement section (first calculation means)
32 channel variation estimation section (second calculation means)
33 simplified rank estimation section (first rank estimation means)
34 normal rank estimation section (second rank estimation means)

The invention claimed is:

1. A rank estimation device, which estimates a transmission rank which is most suitable for data transmission based on a received signal at a receiver and reports the transmission rank to a transmitter as feedback information which is reflected to signal transmission in the transmitter, comprising:
a first calculation unit for calculating a reception quality value based on the received signal;
a second calculation unit for calculating a channel variation value which indicates a degree of variation of channel state based on the received signal;
a first rank estimation unit for estimating the transmission rank based on a calculation value obtained by subtracting the reception quality value from the channel variation value; and
a second rank estimation unit for calculating communication capacity between the transmitter and the receiver for all the transmission ranks and estimating the transmission rank which can obtain the maximum communication capacity,
wherein the first rank estimation unit outputs a rank 1 of the transmission rank indicating a poor reception condition when the calculation value is greater than a first threshold value specified for determining the rank 1 in advance as a first condition,
outputs a rank 2 of the transmission rank indicating a good reception condition when the calculation value is smaller than a second threshold value specified for determining the rank 2 in advance as a second condition, and outputs error information when the calculation value satisfies neither of the first condition nor the second condition, and
wherein the second rank estimation unit is used when the error information is outputted from the first rank estimation unit to estimate the transmission rank.

2. The rank estimation device according to claim 1, wherein the first threshold value is a value greater than the second threshold value, and
wherein when the calculation value is greater than the second threshold value and smaller than the first threshold value, the first rank estimation unit outputs the error information.

3. A rank estimation device, which estimates a transmission rank which is most suitable for data transmission based on a received signal at a receiver and reports the transmission rank to a transmitter as feedback information which is reflected to signal transmission in the transmitter, comprising:
- a first calculation unit for calculating a reception quality value based on the received signal;
- a second calculation unit for calculating a channel variation value which indicates a degree of variation of channel state based on the received signal;
- a first rank estimation unit for estimating the transmission rank based on a calculation value which is obtained by subtracting the reception quality value from the channel variation value, and is compared with predetermined threshold values for outputting a rank 1 of the transmission rank indicating a poor reception condition or a rank 2 of the transmission rank indicating a good reception condition;
- a second rank estimation unit for calculating communication capacity between the transmitter and the receiver for all the transmission ranks and estimating the transmission rank which can obtain the maximum communication capacity; and
- a switching unit for comparing the transmission ranks estimated by each of the first rank estimation unit and the second estimation unit and switching the rank estimation unit used when the transmission rank is estimated to the first rank estimation unit or the second rank estimation unit according to the comparison result,
- wherein the switching unit performs the switching to the second rank estimation unit when the transmission ranks are not the same.

4. The rank estimation device according to claim 3, wherein the selected rank estimation unit is used for the successive rank estimation process, and the switching unit performs the comparison at a predetermined time interval.

5. The rank estimation device according to claim 3, wherein the switching unit performs the switching to the first rank estimation unit when a case in which the transmission rank estimated by the first rank estimation unit is the same as the transmission rank estimated by the second rank estimation unit occurs a predetermined number of times continuously.

6. A receiver comprising the rank estimation device according to claim 1 on the receiver.

7. A communication system comprising:
- a transmitter which performs most suitable signal transmission for data transmission based on a transmission rank reported as feedback information on a received signal; and
- a receiver which estimates the transmission rank based on the received signal and reports the estimated transmission rank to the transmitter, wherein the receiver includes:
- a first calculation unit for calculating a reception quality value based on the received signal;
- a second calculation unit for calculating a channel variation value which indicates a degree of variation of channel state based on the received signal;
- a first rank estimation unit for estimating the transmission rank based on a calculation value obtained by subtracting the reception quality value from the channel variation value; and
- a second rank estimation unit for calculating communication capacity between the transmitter and the receiver for all the transmission ranks and estimating the transmission rank which can obtain the maximum communication capacity,
- wherein the first rank estimation unit outputs a rank 1 of the transmission rank indicating a poor reception condition when the calculation value is greater than a first threshold value specified for determining the rank 1 in advance as a first condition,
- outputs a rank 2 of the transmission rank indicating a good reception condition when the calculation value is smaller than a second threshold value specified for determining the rank 2 in advance as a second condition, and outputs error information when the calculation value satisfies neither of the first condition nor the second condition, and
- wherein the second rank estimation unit is used when the error information is outputted from the first rank estimation unit to estimate the transmission rank.

8. A rank estimation method of a rank estimation device which estimates a transmission rank which is most suitable for data transmission based on a received signal at a receiver and reports the transmission rank to a transmitter as feedback information which is reflected to signal transmission in the transmitter, comprising the steps of:
- a first calculation step of calculating a reception quality value based on the received signal by a first calculation unit;
- a second calculation step of calculating a channel variation value that indicates a degree of variation of channel state based on the received signal by a second calculation unit;
- a first estimation step of estimating the transmission rank by a first rank estimation unit based on a calculation value obtained by subtracting the reception quality value from the channel variation value; and
- a second estimation step of calculating communication capacity between the transmitter and the receiver for all the transmission ranks and estimating the transmission rank which can obtain the maximum communication capacity by a second estimation unit,
- wherein the first estimation step includes,
- outputting a rank 1 of the transmission rank indicating a poor reception condition when the calculation value is greater than a first threshold value specified for determining the rank 1 in advance as a first condition,
- outputting a rank 2 of the transmission rank indicating a good reception condition when the calculation value is smaller than a second threshold value specified for determining the rank 2 in advance as a second condition, and outputting error information when the calculation value satisfies neither of the first condition nor the second condition, and
- wherein the second estimation step is performed when the error information is outputted from the first rank estimation unit to estimate the transmission rank.

9. A non-transitory computer readable recording medium having embodied thereon a computer program, which when executed by a computer causing the computer functioning as a rank estimation device which estimates a transmission rank which is most suitable for data transmission based on a received signal at a receiver and reports the transmission rank to a transmitter as feedback information which is reflected to signal transmission in the transmitter, to perform the process of:
- a first calculation process of calculating a reception quality value based on the received signal;
- a second calculation process of calculating a channel variation value that indicates a degree of variation of channel state based on the received signal;

a first rank estimation process of estimating the transmission rank based on a calculation value obtained by subtracting the reception quality value from the channel variation value; and a second rank estimation process of calculating communication capacity between the transmitter and the receiver for all the transmission ranks and estimating the transmission rank which can obtain the maximum communication capacity, wherein the first rank estimation process includes, a first outputting process of outputting a rank 1 of the transmission rank indicating a poor reception condition when the calculation value is greater than a first threshold value specified for determining the rank 1 in advance as a first condition, a second outputting process of outputting a rank 2 of the transmission rank indicating a good reception condition when the calculation value is smaller than a second threshold value specified for determining the rank 2 in advance as a second condition, and a third outputting process of outputting error information when the calculation value satisfies neither of the first condition nor the second condition, and wherein the second rank estimation process is performed when the error information is outputted as the third outputting process.

* * * * *

UNITED STATES PATENT AND TRADEMARK OFFICE
CERTIFICATE OF CORRECTION

PATENT NO.         : 8,792,585 B2  Page 1 of 1
APPLICATION NO.    : 13/254331
DATED              : July 29, 2014
INVENTOR(S)        : Masahito Sakai It is certified that error appears in the above-identified patent and that said Letters Patent is hereby corrected as shown below:

In the Specification

Column 3, Line 7: Delete "speed a" and insert -- speed $\alpha$ --

Column 5, Line 6: Delete "Sinai" and insert -- Signal --

Column 9, Line 16: Delete "speed a" and insert -- speed $\alpha$ --

Column 9, Line 20: Delete "speed a" and insert -- speed $\alpha$ --

Signed and Sealed this
Twenty-fourth Day of February, 2015

Michelle K. Lee
*Deputy Director of the United States Patent and Trademark Office*